United States Patent [19]

Friedericy et al

[11] Patent Number: 4,481,840
[45] Date of Patent: Nov. 13, 1984

[54] LAYERED FLYWHEEL WITH STRESS REDUCING CONSTRUCTION

[75] Inventors: Johan A. Friedericy, Palos Verdes Estates; Dennis A. Towgood, Huntington Beach, both of Calif.

[73] Assignee: The United States of America as represented by the United States Department of Energy, Washington, D.C.

[21] Appl. No.: 326,466

[22] Filed: Dec. 2, 1981

[51] Int. Cl.³ ............................................. G05G 3/00
[52] U.S. Cl. ........................................ 74/572; 428/192; 156/288
[58] Field of Search .................. 74/572; 428/192, 294; 156/288, 293, 297, 228

[56] References Cited

U.S. PATENT DOCUMENTS

| | | | |
|---|---|---|---|
| 670,385 | 3/1901 | Howland-Sherman | 74/572 |
| 860,336 | 7/1907 | Schultz | 74/572 |
| 1,203,267 | 10/1916 | Reeves | 74/572 |
| 1,902,505 | 3/1933 | Johnson | 74/532 |
| 1,969,755 | 10/1934 | Kellogg | 271/2.3 |
| 2,404,515 | 7/1946 | Meyer | 74/572 |
| 3,305,616 | 2/1967 | Chanoch | 264/157 |
| 3,348,990 | 10/1967 | Zimmerman et al. | 156/293 |
| 3,602,066 | 8/1971 | Wetherbee | 74/572 |
| 3,672,241 | 6/1972 | Rabenhorst | 74/572 |
| 3,698,262 | 10/1972 | Rabenhorst | 74/572 |
| 3,724,288 | 4/1973 | Jakubowski | 74/572 |
| 3,737,694 | 6/1973 | Rabenhorst | 310/74 |
| 3,764,436 | 10/1973 | Schmidt et al. | 156/288 |
| 3,788,162 | 1/1974 | Rabenhorst et al. | 156/297 X |
| 3,884,093 | 5/1975 | Rabenhorst | 74/572 |
| 3,964,341 | 6/1976 | Rabenhorst | 74/572 |
| 4,036,080 | 7/1977 | Friedericy et al. | 74/572 |
| 4,088,041 | 5/1978 | Kraus | 74/572 |
| 4,156,054 | 5/1979 | Gurewitsh | 428/192 X |
| 4,176,563 | 12/1979 | Younger | 74/572 |
| 4,183,259 | 1/1980 | Giovachini et al. | 74/572 |
| 4,186,623 | 2/1980 | Friedericy et al. | 74/572 |
| 4,286,475 | 9/1981 | Friedericy et al. | 74/572 |

FOREIGN PATENT DOCUMENTS

| | | | |
|---|---|---|---|
| 7606440 | 12/1973 | Netherlands | 74/572 |
| 1048441 | 11/1966 | United Kingdom | 156/293 |

*Primary Examiner*—Gary L. Smith
*Assistant Examiner*—Anthony W. Raskob, Jr.
*Attorney, Agent, or Firm*—L. E. Carnahan; Roger S. Gaither; Michael F. Esposito

[57] ABSTRACT

A flywheel having elastic spokes carrying an elastic rim; and a hub coupling the spokes to a shaft and deforming in response to centrifugal force to match the radial distortion of the spokes.

53 Claims, 9 Drawing Figures

LAYERED FLYWHEEL WITH STRESS REDUCING CONSTRUCTION

BACKGROUND AND SUMMARY OF THE INVENTION

This invention relates to a flywheel. More particularly, this invention relates to a flywheel for ultra-high speed operation having a rim and a hub including radially extending spokes coupling the rim to a shaft.

Flywheels have long been recognized as convenient devices for the storage of mechanical energy. Energy is stored in a flywheel by causing it to rotate at a high speed about an axis of rotation defined by a shaft. By mounting the shaft in low-friction bearings and the flywheel in an evacuated chamber, frictional energy losses are minimized. Thus, the flywheel has come to be recognized as a convenient device for the relatively long-term storage of energy. Particular attention has been directed to the flywheel as a device for energy storage in mass-transportation vehicles operating under stop-and-go conditions. For example, the flywheel may be charged with energy by bringing its rotational speed to a high level while the vehicle is stopped. Energy is then drawn from the flywheel to accelerate the vehicle and power it toward its next stop. By using regenerative braking energy which would conventionally be dissipated as heat is returned to the flywheel for later use. Thus, the flywheel provides a conceptually simple means of storing energy for vehicular and other uses.

However, attempts to construct and utilize such a flywheel have been fraught with difficulties and failures. For example, because the energy stored in a flywheel varies directly with its moment of inertia and as the square of its rotational speed, very high operating speeds for the flywheel are desired. Further, in order to obtain best performance from a vehicle, the weight of the flywheel must be kept to a minimum to reduce vehicle weight. Therefore, flywheels having a rim have been recognized as offering the highest moment of inertia for a given weight. When the rim is made of a multitude of concentric annular shells made from circumferentially extending unidirectional filamentary material in a matrix it is well adapted to withstand the high stresses imposed by centrifugal force at high rotational speeds. Such flywheels conventionally have a hub including spokes coupling the rim to the shaft. U.S. Pat. Nos. 860,336; 3,724,288; 3,964,341; 4,036,080; 4,176,563; 4,183,259 and 4,186,623 illustrate such flywheels.

However, even though the stress imposed by centrifugal force varies with the square of the radius from the axis of rotation so that the rim is most highly stressed, at the ultrahigh rotational speeds desired the spokes are also highly stressed. Thus, the desirability of also making the spokes of high-strength, low-weight unidirectional filamentary material in a matrix has been recognized. U.S. Pat. No. 4,286,475 illustrates such a flywheel.

Unfortunately, at the ultra-high rotational speeds desired, the rim and spokes of a flywheel stretch and distort to expand radially. Even the unidirectional filamentary material embedded in a matrix is elastic and deforms when exposed to the high centrifugal forces created by ultra-high speed operation of a flywheel. Thus, the flywheel designer is left with the difficult problem of how to unite matrix material spokes to form of hub for the flywheel. U.S. Pat. No. 4,286,475 illustrates one solution to this problem.

In view of the many deficiencies of the flywheel art, it is an object for this invention to provide a flywheel having a rim and spokes coupled to a shaft by hub portions which distort in reponse to centrifugal force to match the distortion of the spokes.

Another object for this invention is to provide a hub for a flywheel having spokes substantially avoiding stress concentrations between the spokes and the remainder of the hub.

Still another object for this invention is to provide a hub for a flywheel with spokes of unidirectional filamentary material embedded in a matrix.

In summary, one embodiment of this invention provides a flywheel having a rim and spokes of filamentary material embedded in a matrix. The spokes engage the rim and extend radially inwardly toward but short of the axis of rotation. A hub includes portions axially coextensive with each spoke over a radially extending segment of the latter. The portions are adhesively bonded to the spokes and decrease in transverse cross sectional area with increasing radius throughout the radially extending segment. During operation of the flywheel, the portions distort in response to centrifugal force to expand radially substantially in unison with the spokes.

Other objects and advantages of the invention will appear in light of the following detailed description of a preferred embodiment of the invention.

DETAILED DESCRIPTION OF THE PREFERRED EMBODIMENTS

Figure 1:
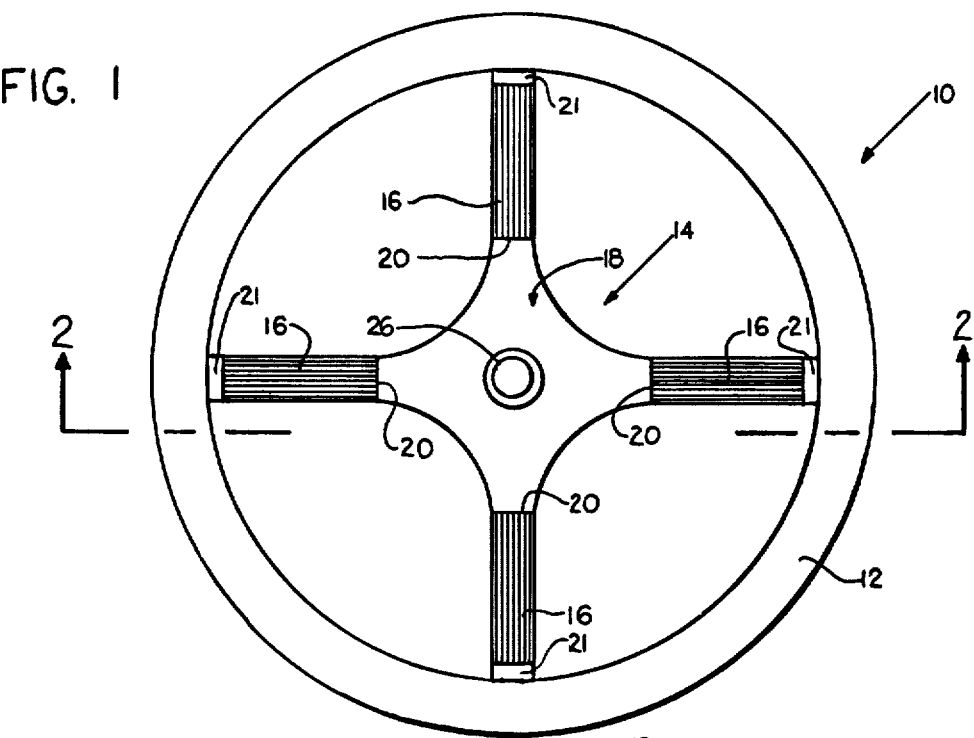
FIG. 1 is an axial plan view of a flywheel embodying the invention.

FIG. 1 illustrates a flywheel 10 having a rim 12 and a hub generally referenced by the numeral 14. The rim 12 is preferably of a conventional construction providing a high ratio of moment of inertia to weight and also a high ratio of elastic modulus to density. For example, the rim 12 may be constructed in accordance with the teachings of U.S. Pat. Nos. 4,036,080 or 4,186,623. The hub 14 is of cruciform shape in plan view and includes a multitude of radially extending spokes 16. The spokes 16 comprise generally flat-sided bars of unidirectional filamentary material embedded in a matrix. The filamentary material extends longitudinally in the bars so that the filaments extended radially in the spokes 16. The spokes 16 may be made in accordance with the teaching of U.S. Pat. No. 4,286,475, the disclosure of which is hereby incorporated herein to the extent necessary for a full understanding of this invention. The hub 14 also includes a central section 18 which is also of cruciform shape in plan view. The central section 18 includes a multitude of radially extending portions 20 each axially aligning with one of the multitude of spokes 16.

Figure 2:
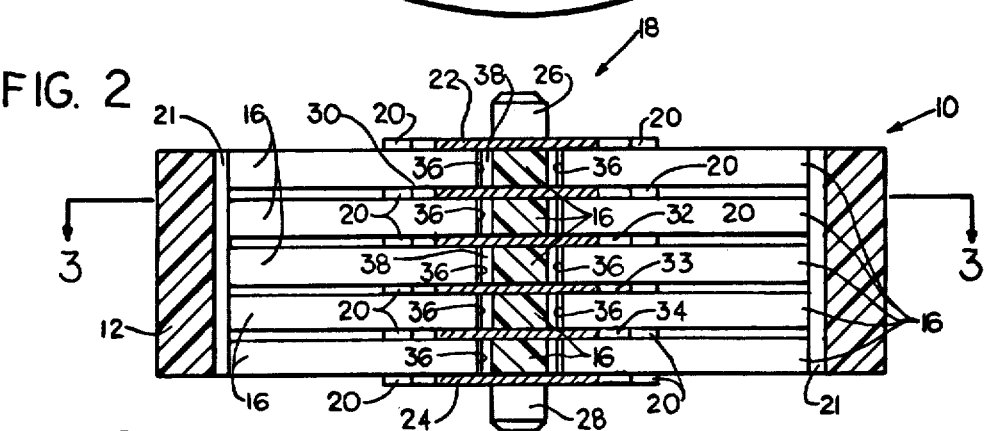
FIG. 2 is an elevation view, partly in cross section, taken along line 2—2 of FIG. 1.

FIG. 2 illustrates that the central section 18 of hub 14 includes a pair of substantially identical cruciform end plates 22 and 24 each of which defines a pintle shaft 26 and 28, respectively, extending axially therefrom. The pintle shafts 26 and 28 cooperate to define an axis of rotation for the flywheel 10. FIG. 2 also illustrates that the spokes 16 are arranged in five axially spaced radial arrays, or axial levels, of four spokes each. The five radial arrays of spokes are axially spaced apart by four substantially identical cruciform spacer plates 30, 32, 33 and 34. The spokes 16 extend radially inwardly from the rim 12 toward but short of the axis of rotation of the flywheel 10. Each of the end plates 22, 24 and each of the spacer plates 30, 32, 33 and 34 define four of the multitude of radially extending portions 20 of the central section 18. The radially extending portions 20 are axially aligning with and contiguous to the spokes 16. Further, the portions 20 are radially coextensive with the spokes 16 over a region of each spoke extending from a radially inner end 36 of each spoke toward but short of the radially outer end of each spoke.

FIGS. 1 and 2 also illustrate that the hub 14 includes four axially extending cap members 21 interposed radially between the radially outer ends of the spokes 16 and the rim 12. The cap members 21 are composed of multidirectional filamentary material embedded in a matrix. For example, the cap members 21 may include a woven cloth of filamentary material embedded in a matrix or a mat of randomly oriented filamentary material embedded in a matrix. In either case, the material from which the cap members 21 are formed has substantially isotropic physical properties. In fact, the cap members 21 may be made of a truly isotropic material such as a metal. For example, the cap members 21 may be made of aluminum alloy material. The cap members 21 extend axially to bridge the axial spaces between the spokes 16. Further, the cap members 21 are adhesively bonded to the outer ends of the spokes 16. Thus, the cap members 21 serve to tie together the radially outer ends of the axially congruent spokes 16 in each of the five levels of the hub 14. Consequently, the cap members 21 increase the rigidity of the hub 14. Still further, the cap members 21 distribute radial loads between the spokes 16 and the rim 12 to avoid stress concentrations in the latter.

Figure 3:
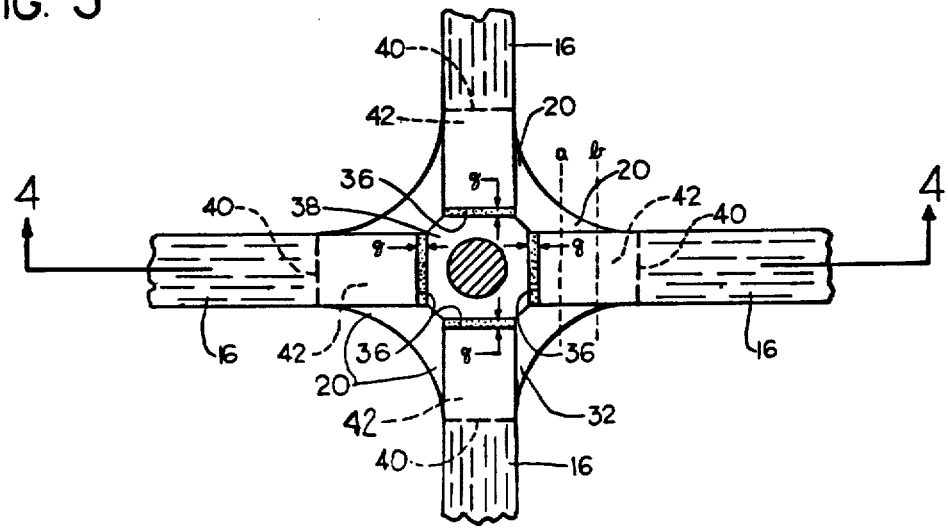
FIG. 3 is an enlarged fragmentary plan view, partly in cross section, taken along line 3—3 of FIG. 2.

FIG. 3 illustrates that each of the radial arrays, or levels, of spokes 16 includes an eight-sided center piece 38. The inner ends 36 of the spokes 16 confront but do not contact the center pieces 38. Thus, the inner ends 36 each define a gap "g" with the center pieces 38. The gaps "g" are filled with a scrim-controlled adhesive bonding the inner ends 36 of the spokes 16 to the center pieces 38. The scrim-controlled adhesive is essentially a fabric cloth impregnated with adhesive. When subjected to pressure during curing of the adhesive, the scrim cloth prevents the adhesive from being squeezed out of the joint. Thus, the gaps "g" may be controlled to a high degree of accuracy to insure concentricity of the spokes 16 and rim 12 with the axis of rotation of the flywheel 10.

FIG. 3 also illustrates that the spacer plates 30, 32, 33, and 34 each have a cruciform shape in plan view which is substantially identical to that of the end plates 22 and 24. The portions 20 of the end plates 22 and 24 and of the spacer plates 30, 32, 33 and 34 are each axially contiguous to one of the radial arrays of spokes 16. Further, the portions 20 each extend radially outwardly to terminate in a radially outer end 40. The end 40 of each portion 20 is radially outward of the inner end 36 of each spoke 16. Thus, the portions 20 are radially coextensive with the spokes 16 over a region 42 extending from the end 36 to the end 40. Within the region 42, the portions 20 each decrease in transverse cross sectional area with increasing radius. For example, by comparing the transverse width of the portion 20 at the plane defined by the line "a", viewing FIG. 3, with the width of the portion at the line "b" and noting that the portion has a substantially constant axial thickness, it will easily be seen that the cross sectional area of the portion decreases with increasing radius within the region 42.

Figure 4:
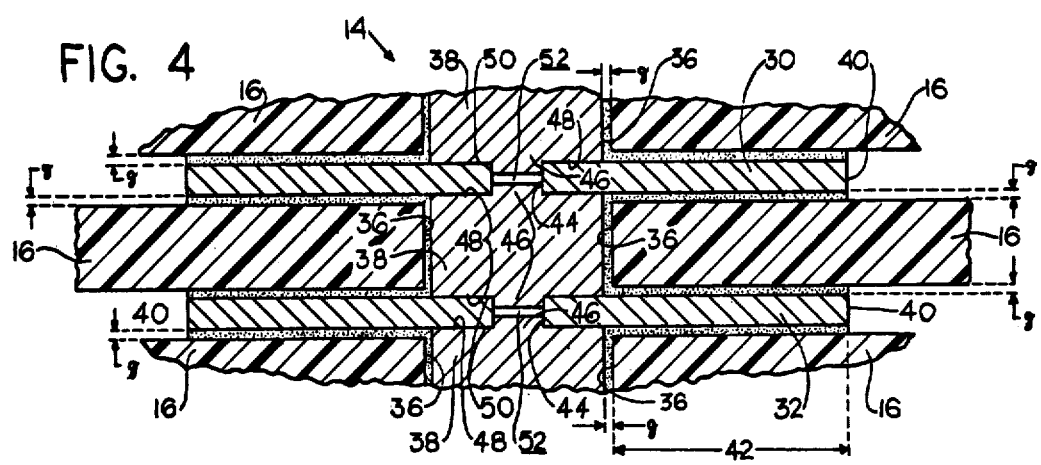
FIG. 4 is a fragmentary cross sectional view taken along line 4—4 of FIG. 3.

Viewing FIG. 4, it will be seen that within the region 42, the spokes 16 do not actually contact the spacer plates 30–34 or end plates 22, 24. Moreover, the center pieces 38 have a greater axial dimension than do the spokes 16. Thus, the spacer plates 30–34 and end plates 22, 24 are spaced apart by the center pieces 38 to define a gap "g" with the spokes 16. The gap "g" is filled with a scrim-controlled adhesive bonding the spokes 16 to the plates 22, 24 and 30–34.

FIG. 4 also illustrates that the spacer plates 30–34 define axially extending apertures 44 circumscribing and concentric with the axis of rotation of flywheel 10. The center pieces 38 include reduced-diameter bosses 46 extending axially into the apertures 44 to insure concentricity of the center pieces 38 with the spacer plates 30–34. The bosses 46 cooperate with the remainder of each spacers 38 to define annular shoulders 48 circumscribing the bosses 46. The shoulders 48 engage the spacer plates 30–34 to define radially extending annular bonding areas 50. Because the plates 22, 24 and 30–34 and center pieces 38 are made of metal, they may be brazed together at the bonding areas 50 to form a unitary central section 18 for the hub 14. Alternatively, the plates and center pieces may be adhesively bonded together by a suitable metal-to-metal adhesive. Such an adhesive is made by Minnesota Mining and Manufacturing and sold under the name Scotch Weld 2214. Viewing FIG. 4, it will be seen that the bosses 46 of adjacent center pieces 38 cooperate to define chambers 52 within the apertures 44. When the central section 18 is assembled with adhesive, the chambers 52 form convenient reservoirs for the adhesive so that each of the adjacent center pieces 38 are also bonded together. It will be understood in light of the above that the end plates 22, 24 each define a recess (not shown) for receiving the boss of the adjacent center piece 38 so that the end plates 22, 24 also define annular bonding areas 50 and chambers 52.

Figure 5:
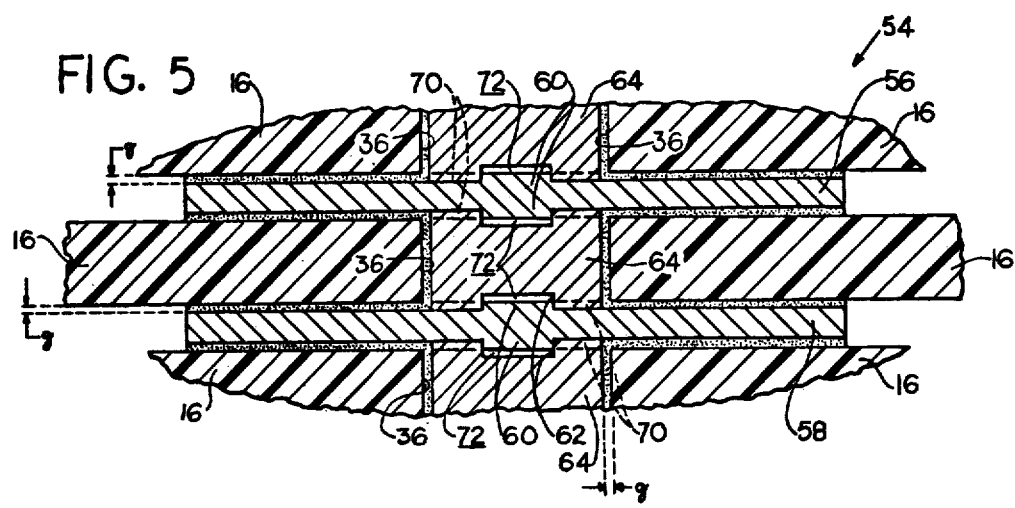
FIG. 5 is a fragmentary cross sectional view similar to FIG. 4 and illustrating an alternative embodiment of the invention.
Figure 6:
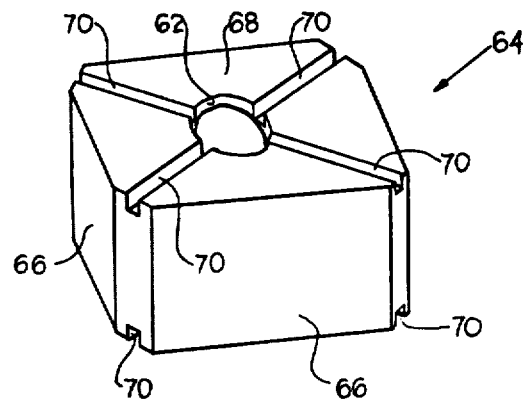
FIG. 6 is an isolated perspective view of a component part of the flywheel illustrated in FIG. 5.

FIGS. 5 and 6 illustrate an alternative embodiment of the invention wherein a flywheel hub 54 includes spokes 16 arranged as in the embodiment illustrated by FIGS. 1–4. However, the embodiment illustrated by FIGS. 5 and 6 includes cruciform spacer plates 56, 58 and end plates (not shown) each defining axially extending bosses 60 which are received in axially extending recesses 62 defined by center pieces 64. Viewing FIG.

6, it will be seen that the center pieces 64 are eight-sided and define four axially extending surfaces 66 (only two of which are visible in FIG. 6) for bonding to the inner ends 36 of the spokes 16 via scrim-controlled adhesive. The center pieces 64 also define a pair of radially extending end surfaces 68 (only one of which is visible) for bonding to the adjacent spacer plates or end plates. The center pieces also define a number of radially extending grooves 70 extending radially outwardly from the recesses 62 and open at their outer ends. Thus, where an adhesive is used to bond the plates 56 and center pieces 64 together, the grooves 70 allow the escape of trapped air and excess adhesive from chambers 72 defined within the recesses 62.

Figure 7:
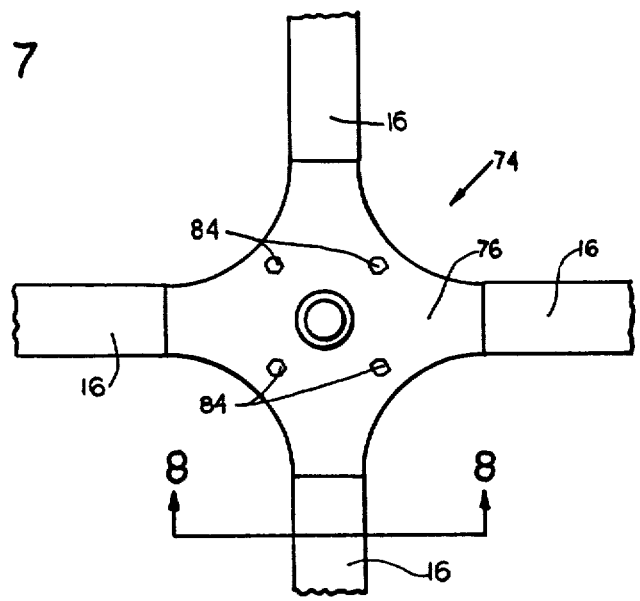
FIG. 7 is a fragmentary axial plan view of a flywheel according to another alternative embodiment of the invention.
Figure 8:
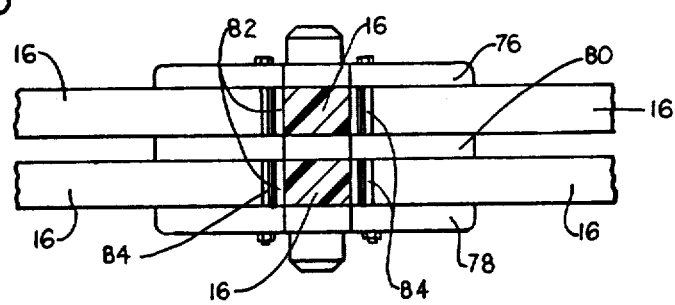
FIG. 8 is a fragmentary elevation view, partly in cross section, taken along line 8—8 of FIG. 7.

FIGS. 7 and 8 illustrate another alternative embodiment of the invention wherein a cruciform flywheel hub 74 includes two axially spaced radial arrays, or axial levels, of spokes 16 which are axially sandwiched with a pair of end plates 76 and 78 and with a single spacer plate 80. The hub 74 includes a pair of center pieces 82. One of the center pieces 82 is received in each one of the radial array of spokes 16. Similarly to the embodiments of FIGS. 1-6, the embodiment illustrated in FIGS. 7 and 8 has the spokes 16 bonded to the center pieces 82 and to the plates 76-80 by scrim-controlled adhesive. However, each of the plates 76-80 defines four holes (not visible in the Figures) axially aligning with similar holes in the other two plates. Four tie bolts 84 pass axially through the holes of the plates 76-80 to apply an axially directed clamping force holding the plates 76-80 together. During assembly of the hub 74, the tie bolts serve to hold the various parts in place while the adhesives cure. Further, the tie bolts assist in holding the component parts of the hub 74 in proper alignment during manufacture to help insure concentricity of the flywheel rim (not shown) and dynamic balance of the flywheel. During use of the hub 74, the tie bolts 84 may remain in place or they may be removed before the hub is used. Removal of the tie bolts insures that they do not interfere with the radial expansion of, and the smooth distribution of stresses within, the hub 74 during operation. Further, removal of the tie bolts 84 obviates any need to provide lashings or other structure preventing the tie bolts from bowing radially outwardly during operation of the flywheel.

Figure 9:
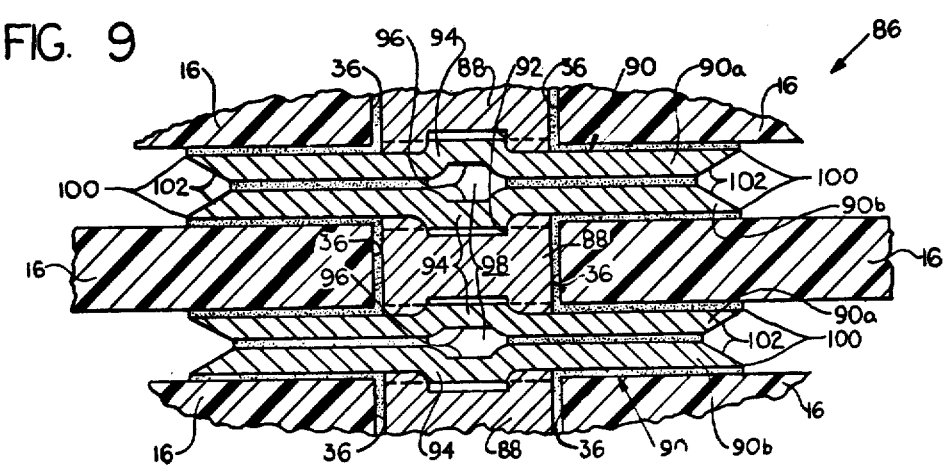
FIG. 9 is a fragmentary cross section view similar to FIGS. 4 and 5 and illustrating yet another alternative embodiment of the invention.

FIG. 9 illustrates yet another alternative embodiment of the invention which is generally similar to the embodiment illustrated by FIGS. 5 and 6. The hub 86 illustrated in FIG. 9 includes a multitude of spokes 16 which are arranged in radial arrays with center pieces 88 and sandwiched with spacer plates 90. The center pieces 88 define axially extending recess 92 receiving axially extending bosses 94 defined by the spacer plates 90. The spokes 16 are bonded to the center pieces 88 and to the spacer plates 90 by scrim-controlled adhesive, as with the embodiment of FIGS. 5 and 6. However, the hub 86 includes cruciform spacer plates 90 which each include a pair of component parts 90a and 90b. The parts 90a and 90b are substantially identical to each other and are secured together back-to-back by a scrim-controlled adhesive. The parts 90a and 90b are each stamped outwardly at 96 to define the bosses 94. Because of the stampings 96, the parts 90a and 90b cooperate to define a cavity 98 therebetween. Each of the parts 90a and 90b defines a radially outer end 100 adjacent one of the spokes 16 and tapers axially and radially from the end 100 toward the interface of the two parts of the spacer plate 90. Because of the taper of the parts 90a and 90b adjacent the ends 100, the parts cooperate to define a circumferentially extending V-shaped notch 102 therebetween. As mentioned supra, the spacer plates 90 are cruciform shaped in plan view so that the tranverse cross sectional area of the spacer plates 90 decreases with increasing radius between the inner ends 36 of the spokes 16 and the outer ends 100 of the plates 90. However, the plates 90 also decrease in cross sectional area with increasing radius near their outer ends because of the notches 102. Thus, the spacer plates define a cross sectional area decreasing to zero substantially steplessly with increasing radius. Consequently, a stress concentration at the radially outer end 100 is substantially avoided.

During operation of a flywheel according to this invention, centrifugal force causes the rim and spokes to expand radially outwardly. The rim 12 is arranged to continuously exert a radially inwardly directed force on the outer ends of the spokes 16 despite the radial expansion of the rim during operation of the flywheel. Despite the inwardly directed force exerted by the rim at the outer end of each spoke, centrifugal force causes the net force at the inner end of the spokes 16 to be directed radially outwardly. As set out supra, the spokes 16 are secured to the central sections of the hubs 14, 54, 74 and 86 only by adhesive bonding. Thus, the outwardly directed force at the inner ends of the spokes 16 tends to pull the spokes out of the central section; causing stresses in and straining of the adhesive bonds. However, the spacer plates 30-34, 56, 58, 80 and 90 and end plates 22 29, 76, 78 also expand radially outwardly in response to centrifugal force. Further, the radially outwardly directed forces on the spokes 16 are transferred to the central sections of the hubs via the spacer plates, end plates and center pieces, causing further radial expansion of the spacer plates and end plates. Because the spacer plates and end plates decrease in cross sectional area with increasing radius between the inner ends 36 of the spokes 16 and the outer ends of the spacer plates and end plates, the plates expand radially substantially in unison with the radial expansion of the spokes 16. Thus, stress concentrations in the adhesive bonds are substantially avoided. Such stress concentrations could cause localized failure of the bonds and a "zipper effect" leading to failure of the entire bond and destruction of the flywheel.

Those skilled in the pertinent art will recognize that the spokes 16 also transfer torque to and from the rim 12. Thus, the adhesive bonding of the spokes 16 to the hubs must not only resist centrifugal forces but also torque-induced forces as well. Such torque-induced forces tend to move the outer ends of the spokes 16 circumferentially with respect to their normal positions. Thus, such forces tend to cause rotational freedom of the spokes relative to their normal positions. Examination of the hub constructions provided by this invention will show that they are well adapted to resist such torque-induced forces because the spokes 16 are bonded to the plates throughout bonding areas which extend radially for a considerable distance as well as circumferentially. The adhesive in these bonding areas is subjected primarily to shear stresses which are well distributed without stress concentrations. Thus, the spokes 16 are secured to the central sections of the hubs substantially without rotational freedom despite the fact that the central sections of the hubs are yieldable radially in response to centrifugal force. That is, the union between the spokes and the central sections of the hubs is substantially rigid circumferentially.

Further, those skilled in the pertinent art will recognize that this invention is not limited to flywheels having multiples of four radial spokes. For example, the flywheel could have two or three radial spokes or a number greater than four. It will be apparent in light of the above that this invention provides a flywheel as well as a method of making a flywheel. While this invention has been described by reference to preferred embodiment thereof, no limitation should be implied because of such reference. The spirit and scope of this invention is set forth by the appended claims which alone define the invention.

We claim:

1. A flywheel comprising a hub rotatable about an axis of rotation, at least a first plurality of spokes extending radially from said hub which cooperate to define a first radial plane transverse to said axis of rotation, and an annular rim in torque-transmitting engagement with said spokes;

said hub including a member defining an axially extending pintle shaft substantially defining said axis, said member also defining a plurality of radially extending portions each axially contiguous to one spoke of said first plurality of radially extending portions respectively to said first plurality of spokes within a radially extending area thereof, each of said plurality of radially extending portions decreasing in transverse cross sectional area with increasing radius within said radially extending area;

each of said first plurality of spokes defining a radially inner end spaced outwardly of said axis of rotation;

said hub further including an axially extending center piece which is axially coextensive with said first plurality of spokes, said center piece defining an outer surface confronting said inner ends of said first plurality of spokes;

adhesive means for bonding said outer surface of said center piece to said inner ends of said first plurality of spokes, and for securing said center piece to said member;

said hub including a second plurality of radially extending spokes cooperating to define a second transverse radial plane, said first and second plurality of spokes axially sandwiching a portion of said radially extending portions of said member therebetween.

2. The invention of claim 1 wherein each one of said second plurality of spokes is axially contiguous to and aligning with a respective one of said plurality of portions, adhesive means for bonding said plurality of portions respectively to said second plurality of spokes within a radially extending area thereof.

3. The invention of claim 1 wherein one of said center piece and said member defines an axially extending boss concentric with said axis of rotation, the other of said center piece and said member defining a recess receiving said boss.

4. The invention of claim 3 wherein said member and said center piece cooperate to define a chamber within said recess, said chamber receiving adhesive means securing said member and said center piece together.

5. The invention of claim 4 wherein said center piece defines said recess, said center piece further defining a vent passage communicating with said chamber and opening outwardly on said center piece.

6. The invention of claim 1 or 2 wherein said member defines a circumferentially extending substantially v-shaped notch at a radially outer end of certain of said portions.

7. The invention of claim 6 wherein said v-shaped notch opens radially outwardly.

8. The invention of claim 6 wherein said member includes a pair of substantially identical parts, said pair of parts being axially stacked and dispose in back-to-back relation.

9. The invention of claim 8 wherein each of said pair of parts is deformed axially outwardly to define an axially extending boss concentric with said axis of rotation.

10. The invention of claim 8 further including adhesive means bonding said pair of parts one to the other.

11. The invention of claim 8 wherein said pair of parts cooperate to define certain of said plurality of radially extending portions, each one of said parts tapering axially at a radially outer end thereof to decrease in transverse cross sectional area adjacent said radially outer end.

12. The invention of claim 8 wherein said pair of parts cooperate to define said v-shaped notch.

13. The invention of claim 1 wherein each of said spokes comprises an elongate bar formed of unidirectional filamentary material embedded in a matrix.

14. The invention of claim 13 wherein said bar is generally flat-sided.

15. The invention of claim 2 wherein said first and said second plurality of spokes cooperate to define an axially congruent pair of said spokes, an axially extending substantially isotropic cap member interposing radially between respective radially outer ends of said pair of spokes and said rim, means bonding said cap member to said pair of congruent spokes.

16. The invention of claim 15 wherein said cap member comprises multidirectional filamentary material embedded in a matrix.

17. A flywheel comprising:

a annular rim means for rotating about an axis substantially concentric therewith;

a plurality of bar means for defining a plurality of radially extending spokes extending radially inwardly from said rim means toward said axis, each of said bar means defining a radially outer end driving engaging said annular rim means, both said rim means and each of said bar means distorting radially in response to centrifugal force when rotating;

a hub drivingly coupling each of said bar means to a shaft, said shaft substantially defining said axis, said hub including yieldable means for securing each of said bar means to said hub substantially without rotational freedom, said yieldable means yielding to centrifugal force to distort radially substantially in unison with each of said bar means;

said yieldable means of said hub including a plurality of radially extending portions, each of said portions terminating in a radially outer end, each of said spokes defining a radially inner end disposed radially inwardly of said outer end of said portions, said portions being contiguous to and bonded to said spokes throughout a bonding region extending from said inner end of said spokes to said outer end of said portions, said portions decreasing in cross-sectional area with increasing radius throughout said bonding region;

said hub further including a center member circumscribing said axis, said center member defining a radially outer surface, said radially inner end of said spokes being bonded to said outer surface of said center member; and said portions extending axially and circumferentially, said portions decreasing in circumferential dimension and in axial dimension with increasing radius within said bonding region.

18. The invention of claim 17 wherein said hub defines a pair of said radially extending portions, said portions being axially spaced apart and receiving said spoke therebetween, both of said portions defining a bonding region with said spoke.

19. The invention of claim 18 wherein said hub includes a pair of plate-like members, said pair of plate-like members respectively defining said pair of portions.

20. A hub for a flywheel having a rim, said flywheel being rotatable about an axis, said hub comprising:
- bar means for defining radially extending spokes of said hub, each one of said bar means being generally flat sided and comprising longitudinally extending unidirectional filamentary material embedded in a matrix;
- plate-like spacer means for spacing apart axially adjacent ones of said bar means;
- a first plurality of said bar means disposed in a radial array with said filamentary material extending radially;
- said plate-like spacer means being axially stacked with said first plurality of bar means, said spacer means including a plurality of radially extending portions, each one of said plurality of portions being axially congruent with a respective one bar means of said first plurality of bar means;
- a second plurality of said bar means disposed in a radial array with said filamentary material extending radially, said second plurality of bar means being axially stacked with said spacer means, each one of said second plurality of bar means being axially congruent with a respective one of said plurality of portions and with the respective one bar means of said first plurality of bar means;
- means for bonding each one of said radially extending portions of said spacer means to both respectively congruent bar means of said first and second plurality of bar means;
- said hub further including a pair of plate-like end members at opposite ends of said hub and axially stacked with said bar means and said plate-like spacer means, each of said end members being provided with an axially extending pintle shaft substantially defining said axis, each of said end members including a multitude of radially extending sections, each one of said multitude of radially extending sections being axially congruent with a respective bar means of an adjacent radially arrayed plurality of said bar means;
- said radially extending portions of said plate-like spacer means and said radially extending sections of said pair of plate-like end members decreasing in transverse cross sectional area with increasing radius said plate-like spacer means and said pair of plate-like end members presenting radially outwardly facing concave peripheries interposed between said radially extending portions and sections;
- means for bonding said multitude of sections respectively to said congruent bar means of said adjacent plurality of said bar means; and
- removable means for securing said pair of end members and said plurality of bar means and spacer means stacked therebetween into a unitary assembly at least during bonding thereof.

21. The invention of claim 20 wherein said securing means comprises a plurality of elongate members having end portions engaging said pair of end members to force said end members toward one another.

22. The invention of claim 21 wherein each of said elongate members comprises a bolt.

23. The invention of claim 21 wherein said plate-like spacer means defines an aperture, said aperture receiving said elongate members.

24. A hub for a flywheel having a rim, said flywheel being rotatable about an axis, said hub comprising:
- bar means for defining radially extending spokes of said hub, each one of said bar means being generally flat sided and comprising longitudinally extending unidirectional filamentary material embedded in a matrix;
- plate-like spacer means for spacing apart axially adjacent ones of said bar means;
- a first plurality of said bar means disposed in a radial array with said filamentary material extending radially;
- a plate-like spacer means axially stacked with said first plurality, said spacer means including a plurality of radially extending portions, each one of said plurality of portions being axially congruent with a respective one bar means of said first plurality of bar means;
- a second plurality of said bar means disposed in a radial array with said filamentary material extending radially, said second plurality of bar means being axially stacked with said spacer means, each one of said second plurality of bar means being axially congruent with a respective one of said plurality of portions and with the respective one bar means of said first plurality of bar means;
- means for bonding each one of said radially extending portions to both respectively congruent bar means of said first and second plurality of bar means;
- at least one of said radially arrayed plurality of bar means including an axially extending center piece circumscribing said axis, said center piece defining a radially outwardly disposed surface confronting said bar means; and
- means for bonding each one of said bar means of said first plurality of bar means to said surface of said center piece.

25. The invention of claim 24 wherein said hub includes at least a multitude of said plate-like spacer means, each one of said multitude of spacer means being axially stacked alternately with successive radially arrayed plurality of said bar means.

26. The invention of claim 25 wherein the number of plurality of said bar means exceeds by one the number of said spacer means.

27. The invention of claim 24 wherein said center piece is polygon shaped in transverse cross section, whereby said surface includes a plurality of substantially planar surface portions, each one of said plurality of surface portions confronting a respective one of said bar means of said one plurality of bar means.

28. The invention of claim 24 wherein said center piece engages said plate-like spacer means one of said spacer means and center piece defining an axially extending boss, the other of said spacer means and center piece defining an axially extending aperture receiving said boss.

29. The invention of claim 28 wherein said spacer means defines said aperture, said aperture extending axially therethrough.

30. The invention of claim 24 wherein each of said plurality of radially extending portions of said spacer means decreases in transverse cross-sectional area with increasing radius.

31. The invention of claim 30 wherein said portions decrease in circumferential dimension with increasing radius.

32. The invention of claim 30 wherein said portions decrease in axial dimension with increasing radius.

33. The invention of claim 32 wherein said spacer means comprises a pair of substantially identical parts disposed in back-to-back relation, said pair of parts cooperating to define a circumferentially extending substantially v-shaped notch at a radially outer end of each one of said plurality of portions.

34. The invention of claim 24 further including an axially extending substantially isotropic cap member radially interposing between respective radially outer ends of an axially congruent pair of said bar means of said rim, means bonding said cap member to said pair of congruent bar means.

35. The invention of claim 34 wherein said cap member comprises multidirectional filamentary material embedded in a matrix.

36. A flywheel having an annular rim rotatable about an axis substantially concentric with said rim,
- a multitude of bars, each one of said multitude of bars comprising length-wise extending unidirectional filamentary material embedded in a matrix, each one of said multitude of bars defining a radially outer end drivingly associating with said annular rim, said multitude of bars extending radially inwardly from said rim toward but short of said axis like spokes,
- hub means for joining said multitude of bars into a unitary assembly;
- said hub means comprising an axially elongate center piece circumscribing said axis, said center piece defining an outer surface, said multitude of bars defining radially inner ends adjacent to said surface of said center piece, and means for bonding said inner ends to said surface;
- said multitude of bars being disposed in a radially extending plane, said hub means further including a pair of plate-like members sandwiching said multitude of bars and said center piece therebetween, means for bonding said pair of plate-like members to said center piece;
- both of said pair of plate-like members including a multitude of radially extending portions corresponding to said multitude of bars, said portions being axially contiguous to said bars, means for bonding said multitude of portions of both of said pair of plate-like members to said multitude of bars; and
- one of said pair of plate-like members defining a pintle shaft, said pintle shaft substantially defining said axis.

37. The invention of claim 36 wherein one of said pair of plate-like members and said center piece defines an axially extending boss, the other of said one plate-like member and said center piece defining an axially extending recess receiving said boss.

38. The invention of claim 37 wherein each one of said plate-like members defines an axially extending recess extending therethrough.

39. The invention of claim 36 wherein each one of said multitude of portions decreases in transverse cross-sectional area with increasing radius.

40. The invention of claim 39 wherein said portions decrease in circumferential dimension with increasing radius.

41. The invention of claim 39 wherein said portions decrease in axial dimension with increasing radius.

42. The invention of claim 40 one of said pair of plate-like members comprises a pair of substantially identical parts stacked axially back-to-back.

43. The invention of claim 42 wherein said pair of parts cooperate to define a multitude of radially extending pairs of projections corresponding to said multitude of bars, said pairs of projections cooperating to define said portions, and said parts cooperating to define a substantially v-shaped circumferentially extending notch at a radially outer end of each of said portions.

44. The invention of claim 36 wherein said multitude of bars includes a pair of said bars which are axially congruent, an axially extending substantially isotropic cap member interposing between said outer end of each of said pair of bars and said rim, means bonding said cap member to said pair of bars.

45. The invention of claim 44 wherein said cap member comprises multidirectional filamentary material embedded in a matrix.

46. A flywheel hub rotatable about an axis, said hub including a central section and a multitude of spokes extending radially outwardly from said central section,
- each one of said multitude of spokes includes a plurality of elongated bars of longitudinally extending unidirectional filamentary material embedded in a matrix,
- at least one spacer plate-like member positioned intermediate an adjacent pair of said elongated bars, said spacer plate-like member defining axially extending bosses,
- said central section including at least one multiple-sided center piece having a plurality of side surfaces positioned adjacent to but spaced from said inner end of said spokes so as to be aligned with certain of said elongated bars,
- adhesive means bonding said elongated bars of said multitude of spokes to said side surfaces of said multiple-sided center piece of said central section,
- said center piece also having a plurality of end surfaces located adjacent to said at least one spacer plate-like member,
- adhesive means bondings said at least one spacer plate-like member to one of said end surfaces of said center piece,
- said center piece also being provided with a recess in each of said end surfaces and with a plurality of radially extending grooves in said end surfaces extending radially outwardly from said recesses and open at the outer ends of said grooves,
- one of said bosses of said spacer plate-like member being located in a recess of said end surface of said center piece, said adhesive means being the sole means for securing said multitude of spokes to said central section.

47. The invention of claim 46 wherein said central section additionally includes a pair of end members each of which is radially coextensive with a portion of said multitude of spokes, said end members each being provides with a pintle shaft, said adhesive means bonding said end members to said multitude of spokes.

48. The invention of claim 47 wherein at least said end members decrease in cross sectional area with increasing radius along each one of said multitude of radially extending spokes.

49. A flywheel comprising:
annular rim means for storing kinetic energy when rotating about an axis of rotation concentric with said rim means; and
a hub for said flywheel, said hub including:
(a) a multitude of generally flat-sided elongate composite bars of longitudinally extending unidirectional filamentary material embedded in a matrix, said multitude of bars being arranged to define a determined number of radially arrayed planar groups of said bars with each group having a certain number of said bars, and respective bars of each of said groups of bars axially aligning to define said certain number of axially and radially extending spokes for said hub with each spoke having said determined number of said bars, each one of said multitude of bars defining a radially outer end drivingly engaging said rim means, and each one of said bars extending radially inwardly toward but short of said axis of rotation to define a radially inner end spaced from said axis;
(b) a multitude of axially extending center pieces, each one of said center pieces defining an outer surface respectively confronting said inner ends of one group of said bars;
(c) adhesive means for bonding said inner ends of each of said groups of bars to the said respective center piece of each group;
(d) a multitude of plate-like members, said plate-like members being axially stacked alternatingly with said groups of bars, and the number of said plate-like members exceeding by one said determined number so that two of said plate-like members define end plates for said hub, said end plates each defining an axially extending pintle shaft substantially defining said axis of rotation, said multitude of center pieces and said multitude of plate-like members defining cooperating means for engaging one another to insure concentricity with said axis;
(e) means for bonding said multitude of plate-like members to said multitude of center pieces;
(f) each one of said multitude of plate-like members including a plurality of radially extending portions corresponding in number to said certain number, each one of said portions being axially congruent with a bar of one of said spokes and further being radially coextensive with said bar over a region extending from the inner end thereof toward but short of said outer end thereof, each one of said plurality of portions decreasing in cross-sectional area with increasing radius within said region; and
(g) adhesive means for bonding each one of said bars to the respectively adjacent portions of said plate-like members.

50. A flywheel comprising:
annular rim means for storing energy when rotating about an axis of rotation;
a plurality of radially extending spoke means for coupling said rim means to a shaft substantially defining said axis of rotation, each spoke means of said plurality of spoke means defining a radially inner end spaced radially outwardly of said axis of rotation;
hub means for coupling said plurality of spoke means to said shaft, said hub means defining a plurality of radially extending portions corresponding to said plurality of spoke means, each of said plurality of radially extending portions defining a radially outer end spaced radially outwardly of said radially inner ends of said plurality of spoke means, said hub means including means for spacing said plurality of radially extending portions away from said plurality of spoke means to define a gap therebetween; and
adhesive means for filling said gap and bonding each of said plurality of radially extending portions to a respective one of said plurality of spoke means.

51. The invention of claim 50 wherein each of said plurality of radially extending portions defines a cross sectional area decreasing with increasing radius between said radially inner ends of said plurality of spoke means and said radially outer ends of said plurality of portions.

52. The invention of claim 50 wherein said means for spacing said plurality of portions away from said plurality of spoke means comprises a member disposed between said radially inner ends of said spoke means, said member defining a radially outer surface confronting and spaced from said radially inner ends of said spoke means to define a second gap therewith, adhesive means for filling said second gap and bonding said member to said radially inner ends of said spoke means.

53. The invention of claim 50 wherein said plurality of radially extending spoke means comprises a multitude of elongate substantially flat-sided bars of longitudinally extending unidirectional filamentary material embedded in a matrix.

* * * * *